April 7, 1925.  
H. A. PYRAH  
1,532,776  
MEANS FOR STARTING INTERNAL COMBUSTION ENGINES  
Filed May 29, 1923
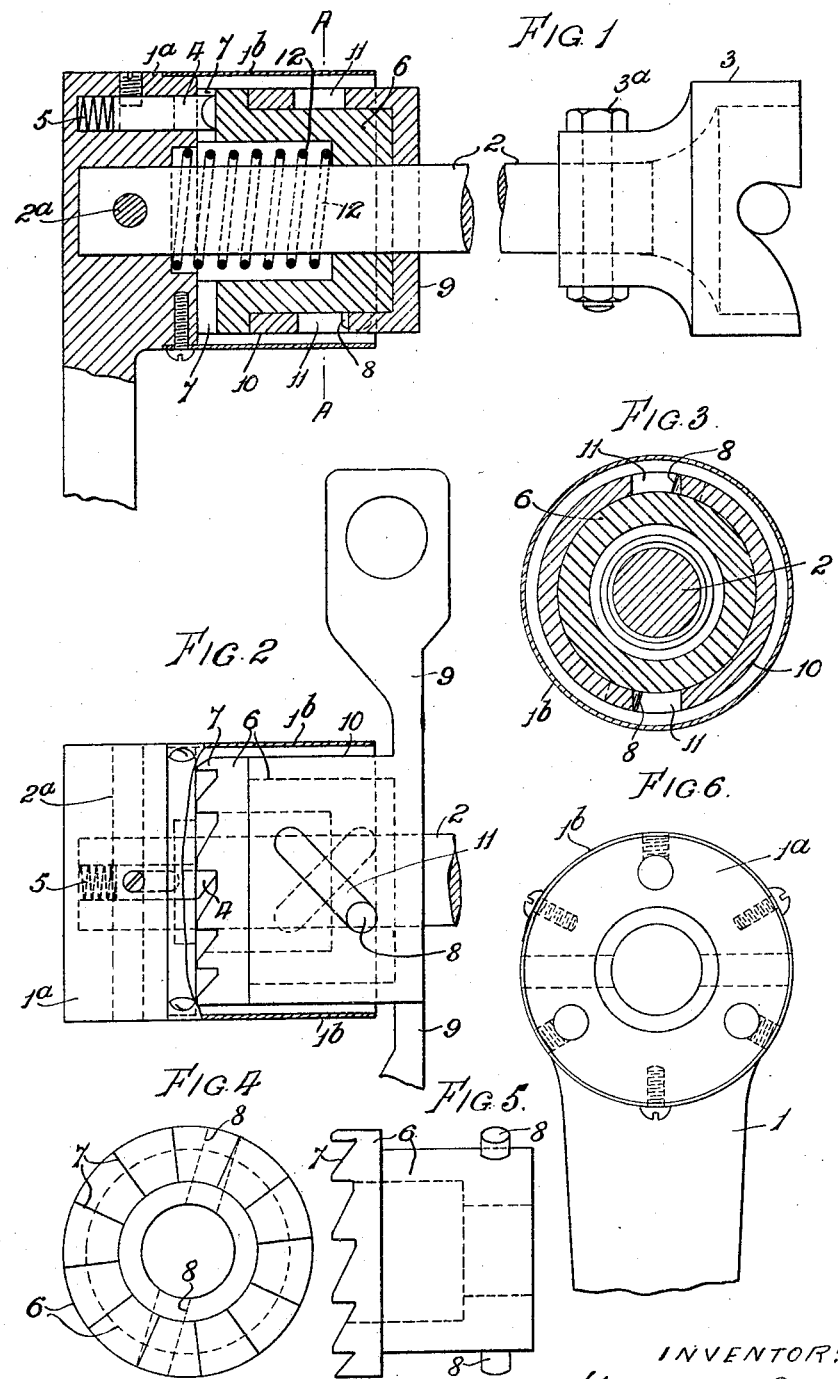
INVENTOR:  
Horace A. Pyrah  
BY Wm Wallace White  
ATTY.

Patented Apr. 7, 1925.

1,532,776

UNITED STATES PATENT OFFICE.

HORACE ARTHUR PYRAH, OF DENTON, ENGLAND.

MEANS FOR STARTING INTERNAL-COMBUSTION ENGINES.

Application filed May 29, 1923. Serial No. 642,268.

*To all whom it may concern:*

Be it known that I, HORACE ARTHUR PYRAH, a subject of the King of Great Britain, residing at Denton, in the county of Lancaster, England, have invented new and useful Improvements in or Relating to Means for Starting Internal-Combustion Engines, of which the following is a specification.

The invention relates to improvements in means for starting internal combustion engines and is especially intended for use in connection with motor cars, motor boats, aircraft and the like and has for its object to provide a device for preventing accidents to the operator in starting the engine by means of the usual handle in consequence of the back firing thereof.

In the accompanying drawings—

Figure 1 is a sectional elevation of a device constructed according to the present invention.

Figure 2 is a plan of part thereof.

Figure 3 is a section taken on the line A—A of Figure 1.

Figure 4 is an end view of the disengage sleeve.

Figure 5 is a side elevation thereof and

Figure 6 is an end view of the boss of the handle.

Referring to the drawings, 1 represents the handle which is provided with a sleeve or socket portion 1$^a$ furnished with an extension 1$^b$ in order to form a recess, said extension being attached to the socket 1$^a$ as shown in any suitable manner or it might be cast or formed integral with said boss 1$^a$.

2 represents the engine clutch shaft which is fixed for rotation with the socket 1$^a$ of the handle 1 by means of a pin 2$^a$ and 3 represents the usual clutch, or connection which is bolted to the spindle 2 by means of a bolt 3$^a$ in the usual manner.

Within a recess or recesses of the socket 1$^a$ of the handle 1 are arranged several, or there might be only one, spring studs or pawls 4 which are adapted to be forced in an outward direction by means of springs 5 and said studs or pawls are provided at their outer ends with inclined ends and are so arranged that they act as latches or pawls as shown in Figure 2.

Within the recess of the socket 1$^a$ of the handle 1 is arranged a sleeve 6 hereinafter referred to as the disengage sleeve and the sleeve 6 is provided upon its end face with ratchet teeth 7 with which the spring studs or pawls 4 are adapted to engage in one direction of motion of the handle 1 and the sleeve 6 is also provided with lateral studs 8 for the purpose hereinafter described.

Bolted or otherwise fixed to the front of the chassis in a suitable position is a bracket or casting 9 having a hollow cylindrical portion 10 adapted to fit within the recess of the socket 1$^a$ of the handle 1 and said cylindrical portion 10 of the bracket 9 is provided with two or more, or there might be only one, diagonal slot or slots 11 in which the studs 8 of the disengage sleeve 6 above referred to fit and work. 12 represents a spring which bears against the disengage sleeve 6 and tends to keep the studs 8 at one end of the slots 11.

In the event of the engine back firing and suddenly turning the clutch shaft 2 the latches or pawls 4 engage the teeth 7 of the sleeve 6 and rotate the same and studs 8 of the disengage sleeve 6 momentarily rotate with the clutch shaft 2 and slide from one end to the other of the diagonal slots 11 in the boss 10 of the fixed bracket or casting 9 and in so doing unclutching the clutch 3 so that any danger of injury to the operator is instantly removed.

It will be understood that the details of construction of the device may be modified without departing from the principle of the invention.

What I claim as my invention and desire to secure by Letters Patent is:—

A device of the class described, comprising, in combination, a rotatable and axially shiftable clutch shaft, a crank handle secured to said shaft and having a socket encircling the end of the shaft, a sleeve mounted upon said shaft and having a plurality of teeth in its end face, spring operated members carried by the socket and adapted to engage the teeth of the sleeve when the handle is rotated in one direction, a stationary cylindrical member encircling said sleeve, said member having a diagonal slot formed therein, and a stud carried by said sleeve and engaging said slot, the arrangement being such that upon reverse rotation of the clutch shaft said shaft and sleeve are axially shifted.

In testimony whereof I have signed my name to this specification.

HORACE ARTHUR PYRAH.